United States Patent [19]

Beckmann et al.

[11] Patent Number: 4,702,557

[45] Date of Patent: Oct. 27, 1987

[54] OPTICAL BRANCHING DEVICE USING A LIQUID CRYSTAL

[75] Inventors: Friedrich K. Beckmann; Horst Dötsch, both of Pinneberg; Wolfgang Hoppe, Norderstedt, all of Fed. Rep. of Germany

[73] Assignee: U.S. Philips Corporation, New York, N.Y.

[21] Appl. No.: 908,887

[22] Filed: Sep. 15, 1986

Related U.S. Application Data

[63] Continuation of Ser. No. 633,726, Jul. 23, 1984, abandoned.

[30] Foreign Application Priority Data

Jul. 29, 1983 [DE] Fed. Rep. of Germany ....... 3327417

[51] Int. Cl.[4] ............................................. G02F 1/13
[52] U.S. Cl. .............................. 350/330; 350/347 V; 350/347 E
[58] Field of Search ................. 350/330, 347 V, 347 E

[56] References Cited

U.S. PATENT DOCUMENTS

| | | | |
|---|---|---|---|
| 3,980,395 | 9/1976 | Giallorenzi et al. | 350/347 V |
| 4,201,442 | 5/1980 | McMahon et al. | 350/347 V |
| 4,278,327 | 7/1981 | McMahon et al. | 350/347 E |
| 4,410,238 | 10/1983 | Hanson | 350/347 E |

OTHER PUBLICATIONS

Iwamura, H. et al., "Optical Isolator and Circulator Using $Y_3Fe_5O_{12}$ Crystals for Optical Fiber Transmission Systems." *Ferrites:Proc. of the Int. Conf.*, pp. 787–790 (Sep.–Oct. 1980), Japan.

Soref, R. A., et al. "Total Switching of Unpolarized Fiber Light with a Formport Electro-Optic Liquid-Crystal Device." *Optic Lett.*, vol. 5, No. 4, pp. 147–149 (Apr. 1980).

*Primary Examiner*—John K. Corbin
*Assistant Examiner*—Richard F. Gallivan
*Attorney, Agent, or Firm*—Marc D. Schechter

[57] ABSTRACT

The invention relates to an optical branching device which may be used as an optical isolator, circulator or switch. The device comprises two polarization-sensitive beam splitters. Each beam splitter comprises a prism and a rhombohedral plate between which a liquid crystal film is interposed. An optical device for rotating the plane of polarization of linearly polarized light is arranged between the two beam splitters. The polarization rotation device may comprise a Faraday rotator with a constant or a switchable direction of magnetization and a half-wave plate. Alternatively, the polarization rotation device may comprise a liquid crystal film interposed between two electrodes.

17 Claims, 3 Drawing Figures

OPTICAL BRANCHING DEVICE USING A LIQUID CRYSTAL

This is a continuation of application Ser. No 633,726 filed July 23, 1984, now abandoned.

BACKGROUND OF THE INVENTION

The invention relates to an optical branching device. The device comprises two polarization-sensitive beam splitters for forming and combining two linearly polarized radiation beams having mutually perpendicular polarization directions. Arranged between the polarization-sensitive beam splitters, the branching device comprises an optical device for rotating the plane of polarization of the parallelly propagating beams. The polarization-sensitive beam splitters each comprise two components which have adjoining plane surfaces, one of which is the base of a prism.

Such an optical branching device has been proposed for use as an optical circulator by H. Iwamura and Y. Suemune in an article entitled "Optical Isolator and Circulator Using $Y_3Fe_5O_{12}$ Crystals for Optical Fiber Transmission Systems" (*FERRITES: Proc. of the Int. Conf.*, September–October 1980, Japan, pages 787–790). The polarization-sensitive beam splitters each comprise two calcite prisms whose bases are placed against each other. In addition, each beam splitter has an associated optical deflection element, for example a deviating prism. The deviating prism ensures that the two linearly polarized beams propagate in parallel directions and that these beams traverse the optical polarization rotating device arranged between the two beam splitters. The optical polarization rotating device comprises a Faraday rotator and a half-wave plate.

A similar optical branching device used as an optical switch is disclosed in, for example, German Offenlegungsschrift 3,241,894 (corresponding to U.S. Pat. No. 4,410,238). The optical device arranged between the polarization-sensitive beam splitters with deflection elements now comprises a liquid crystal layer between two electrodes. The electrodes form an electric field inside the liquid crystal layer.

Both optical branching devices have the disadvantage that their polarization-sensitive beam splitters each comprise two prisms consisting of birefringent monocrystals. Such prisms are comparatively expensive and are therefore not suitable for general use in optical data or communication systems.

Another disadvantage is that each polarization-sensitive beam splitter must be used in conjunction with an optical light deflection element, for example a mirror or a deviating prism. This results in larger optical branching devices, so that these devices are not suitable for use in integrated optical fiber systems.

SUMMARY OF THE INVENTION

It is an object of the invention to provide an optical branching device which comprises less expensive polarization-sensitive beam splitters, and which does not require the use of separate light deflection elements so that a more compact construction is obtained.

This object is achieved by arranging a rhombohedral plate on the base of each prism with a liquid crystal layer interposed between each prism and the associated plate. The prism and plate are arranged so that the beams emerge from the prism and plate parallel to each other and facing the optical polarization roating device. The plates are arranged on opposite sides of the longitudinal axis of the branching device. The prisms and the rhombohedral plates are made of an amorphous material.

Optical branching devices of this construction are relatively inexpensive because the polarization-sensitive beam splitters are not made of expensive monocrystalline prisms such as calcite prisms. The components of each polarization-sensitive beam splitter (the prism and the rhombohedral plate) can now be made of glass or a suitable transparent plastic with an interposed liquid crystal layer. The use of liquid crystals for polarization splitting is described by R. A. Soref, et al in an article entitled "Total switching of unpolarized fiber light with a four-part electro-optic liquid-crystal device" (*Optics Letters*, Vol. 5, No. 4, pages 147–149, April 1980).

The special construction of the polarization-sensitive beam splitters obviates the need for additional light deflection elements, for example prisms or mirrors. In this way a compact optical branching device is obtained which is suitable for use in integrated optical date or communication systems.

The prisms and rhombohedral plates are so arranged relative to each other that the perpendicular and linearly polarized beams extend parallel to each other after they have emerged from the polarization-sensitive beam splitter. The two beam splitters are rotated 180° relative to each other about the longitudinal axis of the optical branching device, so that a beam which emerges from the prism of one polarization-sensitive beam splitter enters the rhombohedral plate of the other beam splitter and vice versa. The longitudinal axis extends parallel to the liquid crystal layers.

In a suitable embodiment of the invention, the optical polarization rotating device comprises a Faraday rotator and a half-wave plate. The rotator and wave plate are arranged so that the direction of polarization of the beam is maintained upon passage through this device in one direction and is reversed upon passage in the other direction.

In this way, an optical circulator is obtained in which a plurality of optical ports (for example four ports labeled 1 to 4 in FIG. 1) are so coupled to each other that the light which enters via port 1 goes to port 2, light which enters via port 2 it goes to port 3, etc.

In another advantageous embodiment of the invention, the optical polarization rotating device comprises a Faraday rotator, a half-wave plate, and a switchable magnetizing device for changing the magnetization of the Faraday rotator. The direction of polarization of the radiation is either unchanged or rotated through 90° by the optical polarization rotating device, depending on the state of the magnetizing device.

The optical polarization rotating device may alternatively comprise a liquid crystal layer interposed between two transparent electrode layers.

The optical branching device may be used as a switch. Depending on the direction of magnetization or the electric field, the light which enters the branching device via a first port is routed to one of two other ports.

In a particularly advantageous embodiment, the surfaces of the device are provided with antireflection coatings and/or are cemented to each other by an optically suitable adhesive. This reduces radiation losses in the branching device. Cementing the components to each other also produces a more stable and compact construction.

Suitably the prisms and rhombohedral plates may be provided with collimator lenses and fiber connectors on their sides which are remote from the optical polarization rotating device, enabling the branching device to be integrated in optical circuits in a relatively simple manner.

BRIEF DESCRIPTION OF THE DRAWING FIGURES

FIG. 1 schematically shows a branching device which functions as an optical circulator and which comprises a permanent magnet.

FIG. 2 schematically shows a branching device which operates as an optical switch and which comprises a switchable magnet for obtaining different switching states.

FIG. 3 schematically shows a branching device which operates as an optical switch and in which the optical polarization rotating device comprises a liquid crystal layer interposed between two transparent electrode layers.

DETAILED DESCRIPTION OF THE PREFERRED EMBODIMENTS

Figure 1:
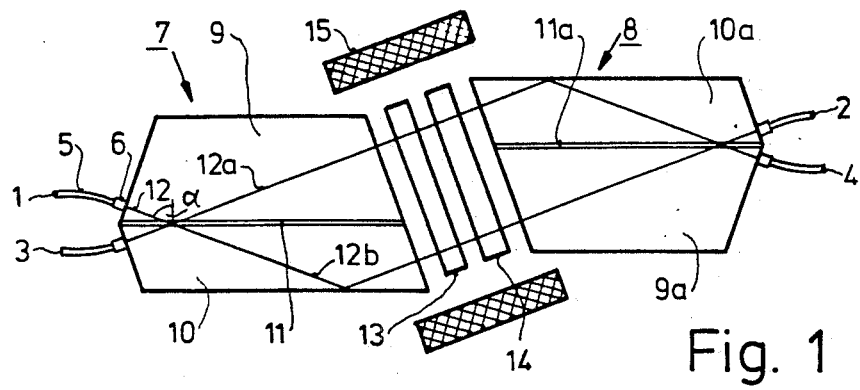

FIG. 1 shows an optical branching device comprising four optical ports 1, 2, 3 and 4. Each port comprises, for example, an optical fiber 5. On the end of each optical fiber, focussing lens 6, for example a cylindrical lens with a radially varying refractive index profile (a Selfoc TM lens), is arranged.

Two optical ports 1 and 3 or 2 and 4 are connected to each polarization-sensitive beam splitter 7 and 8, respectively, of the optical branching device. The beam splitters 7 and 8 are identical. Each beam splitter comprises a prism 9 and 9a respectively, and a plate 10 and 10a, respectively, of rhombohedral cross-section. Each rhombohedral is arranged on the base of the associated prism.

Thus, the optical port 1 is optically connected to the prism 9, the port 3 to the rhombohedral plate 10, the port 2 to the rhombohedral plate 10a and the port 4 to the prism 9a. For this purpose the lenses 6 may be cemented to the relevant prisms or plates.

A liquid crystal layer 11 or 11a, respectively, is interposed between the prism and the rhombohedral plate of each beam splitter 7 and 8. Each liquid crystal layer splits the incident beam 12 into two beams 12a and 12b which are linearly polarized perpendicularly to each other.

Opposite surfaces of the prisms and plates (which are made of, for example, glass or a suitable transparent plastics), are situated at a distance of 5 to 10 mm from each other and have been treated by grinding or vapour deposition in such a way that the liquid crystal molecules are oriented regularly on these surfaces. In the device of FIG. 1 the longitudinal axes of the liquid crystal molecules extend, for example, perpendicular to the plane of the drawing. This orientation of the molecules is maintained over the entire thickness of the layer.

The birefringence of the liquid crystal (i.e. the different refractive indices $n_1$ and $n_2$ for light which is polarized parallel and perpendicular, respectively, to the molecular axes) is used for polarization-dependent separation by selecting a material for the prisms or rhombohedral plates with a refractive index n which is equal to the index $n_1$ of the liquid crystal. As a result of this, the component of the incident beam 12 which is polarized parallel to the molecular axis (i.e. perpendicular to the plane of the drawing) can traverse the liquid crystal layer without reflection losses, as beam 12b. For the component of the incident beam 12 which is polarized perpendicular to the molecular axis (within the plane of the drawing), the angle of the incidence of the beam 12 on the liquid crystal layer is so selected that sin $\alpha > n_2/n$ (i.e. this component is totally reflected from the interface between the prism 9 and the liquid crystal layer 11 (as beam 12a). Thus, the components with perpendicular directions of polarization are geometrically separated from each other.

The rhombohedral plate 10 is constructed so that the beam 12b is totally reflected from the plate/air interface at such an angle that the two beams 12 and 12b emerge from the beam splitter 7 parallel to each other. The same applies to the beam splitter 8. Moreover, the beams which enter and emerge from the beam splitters extend perpendicular to the entry and exit surfaces.

The planes of polarization of the two beams 12a and 12b are rotated through +45° (viewed in the beam direction) in a Faraday rotator 13. A half-wave plate 14 is arranged so as to cancel this rotation. The beam splitter 8 combines the two beams 12a and 12b. The beam 12b traverses the liquid crystal layer 11a without reflection, and the beam 12a is totally reflected from the layer 11a, so that radiation emerges from the port 2. For this purpose the beam splitter 8 is rotated 180° relative to the beam splitter 7 about the longitudinal axis of the optical branching device. The longitudinal axis extends parallel to the liquid crystal layers.

If light is input into the device via the optical port 2, the rotations of the planes of polarization of the two beams 12a and 12b are added to each other yielding a 90° rotation. As a result, the radiation reaches port 3. This is because the Faraday rotator 13 now rotates the plane of polarization of the radiation −45° viewed in the beam direction, as the direction of magnetization of the magnetized crystal layer which constitutes the Faraday rotator is fixed. The half-wave plate 14 always rotates the planes of polarization in the same direction viewed along the beam.

In the same way as described above, the radiation is coupled from port 3 to port 4, and from port 4 back to port 1. An optical branching device of this type is referred to as an optical circulator. Due to its operation, it is capable of separating transmitting and receiving lines in optical data transmission systems from each other. For example, an optical signal which emerges from port 2 is coupled into the transmitting line connected to port 3. A signal received by port 2 emerges from the line connected to port 1.

A special embodiment of the optical branching device shown in FIG. 1 comprises, for example glass prisms which are 5 mm high and approximately 20 mm wide. The cross-sectional dimension of the associated rhombohedral plate is 3×20 mm. These dimensions do not restrict the size of the polarization-sensitive beam splitter. On the contrary, they even enable the dimensions of the beam splitter to be reduced substantially. Instead of glass, any other amorphous optically transparent material with a suitable refractive index n, for example a plastic, may be used for the prisms and rhombohedral plates.

Optical circulators and branching devices are also suitable for use in the infrared region of the spectrum. This spectral region, which ranges from about 0.8 to 1.6

μm, is becoming increasingly important in optical data transmission by glass fiber.

Apart from optical circulators, optical isolators and switches are also important in optical data transmission. Isolators transmit light in one direction only and block light in the opposite direction. They are used in particular in order to shield a light source, for example a laser, from undesired reflections produced by the optical system to which it is connected. Circulators are employed, inter alia, for the separation of transmitting and receiving lines of optical systems. Optical switches serve, for example, for routing radiation from an input port to different output ports depending on the switching state.

For use in the infrared region above 1.15 μm the Faraday rotator 13 may comprise, for example, an yttrium-iron garnet layer (YIG) whose direction of magnetization extends perpendicular to the plane of the layer. To promote the Faraday rotation, the crystal layer is magnetically saturated by a magnetizing device 15. Device 15 generates a magnetic field which also extends perpendicular to the YIG layer.

Alternatively, the Faraday rotator 13 may comprise a layer of bismuth-substituted gadolinium-iron garnet (Bi:GdIG). Such layers provide a stronger Faraday rotation. They also exhibit a substantial magnetic anisotropy, so that an additional magnetizing device, for example a permanent magnet, may be dispensed with. In this way a more compact construction is obtained.

Since the Faraday rotation is dispersive, i.e. wavelength-dependent, the Faraday rotator may comprise a plurality of magnetic crystal layers of different compositions which are arranged successively in the beam direction.

All of these crystal layers are magnetized in the same direction and contribute to the overall Faraday rotation by an amount which corresponds to a specific Faraday rotation of a layer, measured in degrees per layer thickness, multiplied by the thickness of the crystal layer. The crystal layer thicknesses may be selected so that the overall rotation of all the crystal layers is substantially independent of the wavelength over a large range of wavelengths.

When two crystal layers are employed for the formation of a Faraday rotator 13 one layer may consist of, for example, yttrium-iron garnet (YIG). The other crystal layer may consist of bismuth-substituted gadolinium iron garnet (Bi:GdIG).

The optical circulator described with reference to FIG. 1, which comprises four optical ports 1 to 4, may also be used as a three port circulator. For this purpose one optical port, for example port 3, may be provided with a reflective layer. The radiation is then routed from port 1 to port 2, from port 2 to port 4 and from port 4 to port 1.

Alternatively, the optical circulator may be used as an isolator, for example between ports 1 and 2. The radiation from port 1 is routed to port 2. However, the radiation from port 2 cannot reach port 1 and is routed to port 3. In order to improve the isolation, port 3 may be provided with a reflection-free termination, i.e. with an absorber.

Figure 2:
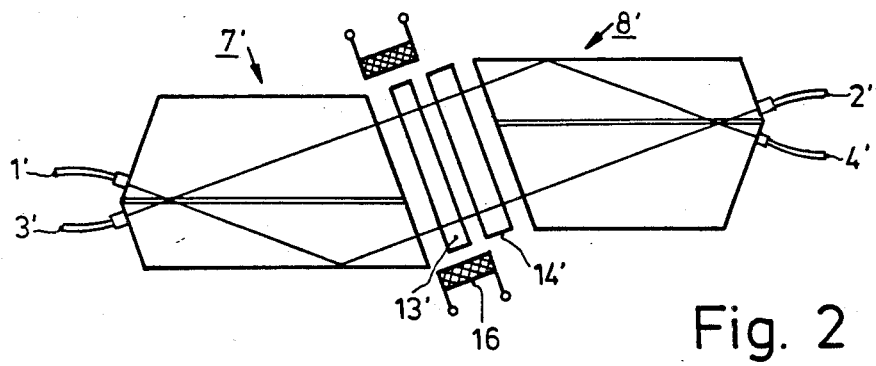

An optical branching device which operates as an optical switch is shown in FIG. 2. This switch is identical to the optical circulator of FIG. 1 except for the magnetizing device. The magnetizing device now comprises a magnet coil 16 whose magnetic field extends perpendicular to the magnetized crystal layer of the Faraday rotator 13'. The crystal layer is also magnetized perpendicular to its surface.

By suitably showing the current direction in the coil 16, the magnetization of the crystal layer of the Faraday rotator 13' can be reversed. In this way, the optical switch can be set to different switching states. Depending on the magnetization of the Faraday rotator 13' the plane of polarization of the light which traverses the Faraday rotator 13' is rotated through +45° or −45°. If the following half-wave plate 14' provides a rotation through −45°, the total rotation of the plane of rotation will be 0° or −90° depending on the switching state. Consequently, the radiation which emerges from port 1' is coupled into port 2' or port 4' depending on the switching state (or the direction of magnetization) of the Faraday rotator 13'. In the present case port 3' would be redundant. This switching action can also be obtained for any other three ports.

Figure 3:
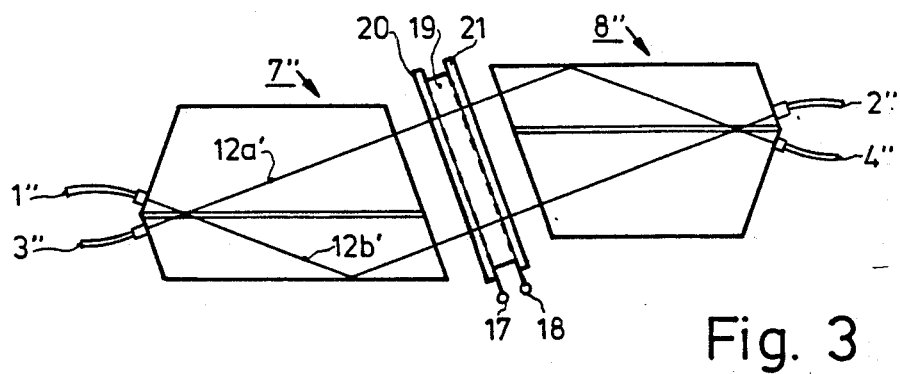

FIG. 3 shows another optical branching device which operates as an optical switch. In principle, its construction is identical to that of the branching devices described with reference to FIGS. 1 and 2, but it comprises a different optical polarization rotating device arranged between the polarization beam splitters 7" and 8". This optical polarization rotating device is a liquid crystal based device.

The polarization rotating device of FIG. 3 comprises a liquid crystal layer 19 between two transparent electrode layers 17 and 18. The liquid crystal and electrode layers are interposed between two glass plates 20 and 21. The surfaces of the glass plates 20 and 21 which face the liquid crystal layer 19 have been ground or provided with a vapor deposited coating to ensure that the molecules of the liquid crystal layer 19 are disposed on the glass plates 20 and 21 with a specific orientation. The longitudinal axes of the molecules are oriented in parallel and in the same direction relative to the plate surfaces.

When an electric field is produced across the liquid crystal layer 19 via the electrodes 17 and 18, the molecules of the liquid crystal layer 19 are aligned in the field direction. If now radiation enters the beam splitter 7" from the optical port 1", the corresponding planes of polarization of the sub-beams 12a' and 12b' are not rotated when they traverse the liquid crystals 19, so that port 2" receives the radiation.

If no electric field is applied via the electrodes 17 and 18, the planes of polarization of the sub-beams 12a' and 12b' are rotated through 90° during passage through the liquid crystals 19. As a result, the optical port 4" receives the radiation. The same applies to radiation which enters through an optical port other than port 1".

The optical switch may be employed as, for example, a bypass switch. The transmitting and receiving units would then be coupled to the optical ports 3" and 2", respectively. An input line is coupled to the optical port 1" and an output line to the optical port 4". When the transmitter and receiver operate an electric field is set up in the liquid crystal layer 19 via the electrodes 17 and 18 so that the transmitter is coupled to the output line (port 3" to port 4") and the input line to the receiver (port 1" to port 2").

If the transmitter fails or is switched off the electric field in the liquid crystal layer is also switched off. The transmitter and the receiver (ports 3", 2") and the input and the output lines (ports 1" and 4") are coupled to each other. In this way, the transmitter/receiver system can test itself, while at the same time the input and output lines (ports 1" and 2") are connected electrodes 17 and 18 are deenergized. By suitably choosing the liquid crystals and the kinds of glass, it is then possible to construct switches which are wavelength-independent over a wide range. The transmission losses are approximately 1.0 dB. A crosstalk attenuation in excess of 25 dB between the outputs is attainable.

In order to prevent undesired reflections, the surfaces of all the optical components in all the optical branching devices described with reference to FIGS. 1 to 3 may be provided with dielectric antireflection coatings applied by vapour deposition. Further, it is possible to cement the individual components of the optial branching device (such as the Faraday rotator, half-wave plate, and polarization beam splitters, or the plates between which the liquid crystal layer is interposed and the polarization beam splitters) to each other, for example by an optical cement. By a suitable choice of this optical cement, optical matching between the individual elements is possible, so that special antireflection coatings may be dispensed with.

What is claimed is:

1. An optical branching device having a longitudinal axis, said device comprising:
    a first polarization-sensitive beam splitter for forming two radiation beams linearly polarized in perpendicular directions;
    a second polarization-sensitive beam splitter for combining two radiation beams linearly polarized in perpendicular directions; and
    an optical polarization rotating device arranged between the first and second polarization-sensitive beam splitters to receive the two linearly polarized radiation beams, said optical polarization rotating device rotating the planes of polarization of the radiation beams;
    characterized in that:
    each polarization-sensitive beam splitter comprises:
        (i) a prism having a planar base, said prism being made of an amorphous material;
        (ii) a rhombohedral plate having a planar surface arranged adjacent to the base of the prism, said prism and base having surfaces such that the two radiation beams formed or combined are parallel to each other, said rhombohedral plate being made of an amorphous material; and
        (iii) a liquid crystal layer arranged between the prism base and the plate;
    the plate of the first polarization-sensitive beam splitter is arranged on a first side of the longitudinal axis; and
    the plate of the second polarization-sensitive beam splitter is arranged on a second side of the longitudinal axis, opposite the first side.

2. An optical branching device as claimed in claim 1, characterized in that the optical polarization rotating device comprises a Faraday rotator and a half-wave plate, said optical polarization rotating device arranged to maintain the direction of polarization of beams passing through it in a first direction, said optical polarization rotating device arranged to rotate 90° the direction of polarization of beams passing through it in a second direction opposite to the first direction.

3. An optical branching device as claimed in claim 2, characterized in that the Faraday rotator comprises a layer of bismuth-substituted gadolinium-iron garnet.

4. An optical branching device as claimed in claim 2, characterized in that the Faraday rotator comprises a plurality of magnetic crystal layers of different compositions stacked in the direction of the radiation beams.

5. An optical branching device as claimed in claim 2, characterized in that the optical polarization rotating device further comprises means for magnetically saturating the Faraday rotator.

6. An optical branching device as claimed in claim 5, characterized in that the Faraday rotator comprises a layer of bismuth-substituted gadolinium-iron garnet.

7. An optical branching device as claimed in claim 5, characterized in that the Faraday rotator comprises a plurality of magnetic crystal layers of different compositions stacked in the direction of the radiation beams.

8. An optical branching device as claimed in claim 2, characterized in that the optical polarization rotating device further comprises means for switchably magnetizing the Faraday rotator, said means switching the magnetization between two opposite directions of magnetization.

9. An optical branching device as claimed in claim 8, characterized in that the Faraday rotator comprises a layer of bismuth-substituted gadolinium-iron garnet.

10. An optical branching device as claimed in claim 8, characterized in that the Faraday rotator comprises a plurality of magnetic crystal layers of different compositions stacked in the direction of the radiation beams.

11. An optical branching device as claimed in claim 1, characterized in that the optical polarization rotating device comprises a liquid crystal layer arranged between two transparent electrode layers.

12. An optical branching device as claimed in claim 11, characterized in that the device further comprises dielectric antireflection coatings on all surfaces thereof.

13. An optical branching device as claimed in claim 11, characterized in that the components of the device are cemented together with a transparent, optically matching adhesive.

14. An optical branching device as claimed in claim 11, characterized in that:
    each polarization beam splitter has an external side facing away from the optical polarization rotating device; and
    the optical branching device further comprises an optical fiber on the external side, and a collimator lens arranged between the external side and the optical fiber.

15. An optical branching device as claimed in claim 1, characterized in that the device further comprises dielectric antireflection coatings on all surfaces thereof.

16. An optical branching device as claimed in claim 1, characterized in that the components of the device are cemented together with a transparent, optically matching adhesive.

17. An optical branching device as claimed in claim 1, characterized in that:
    each polarization beam splitter has an external side facing away from the optical polarization rotating device; and
    the optical branching device further comprises an optical fiber on the external side, and a collimator lens arranged between the external side and the optical fiber.

* * * * *